United States Patent [19]

Nakamura et al.

[11] Patent Number: 6,005,646
[45] Date of Patent: Dec. 21, 1999

[54] VOLTAGE APPLICATION DRIVING METHOD

[75] Inventors: Hajime Nakamura, Yokohama; Michikazu Noguchi, Sagamihara, both of Japan

[73] Assignee: International Business Machines Corporation, Armonk, N.Y.

[21] Appl. No.: 08/995,443

[22] Filed: Dec. 22, 1997

[30] Foreign Application Priority Data

Jan. 20, 1997 [JP] Japan ..................................... 9-007132

[51] Int. Cl.$^6$ ............................. G02F 1/133; G02F 1/139; G09G 3/36
[52] U.S. Cl. .............................. 349/33; 349/42; 349/177; 345/92
[58] Field of Search ................................ 349/143, 33, 34, 349/177, 191; 345/92, 94, 95

[56] References Cited

FOREIGN PATENT DOCUMENTS 8-328045 12/1996 Japan .

OTHER PUBLICATIONS

"A bipolar addressing scheme for a thin film transistor liquid crystal display": Xerox Disclosure Journal, vol. 7, #5, Sep. 1982, XP002062420.

Luo Fang–Chen et al: "Performance of thin film . . . display circuits", IEEE Transactions on Electron Devices, vol. ED–30, #3, Mar. 1983, XP002062421, pp. 202–206.

Bryer et al: "Capacitively Coupled–Transistor . . . LCDS", Proceedings of the SID, vol. 28, No. 2, XP000028052, pp. 109–113.

I–Wei Wu: "High–Definition Displays . . . TFT–LCDS" Journal of the Society for Information Display, vol. 2, No. 1, Apr. 1994, XP000482979 p. 11.

Miyashita et al: "Wide viewing angle . . . crystal cell" Japanese Journal of Applied Physics, vol. 34, No. 2a, Feb. 1995, XP000600430, pp. L177–L179.

*Primary Examiner*—William L. Sikes
*Assistant Examiner*—Tai V. Duong
*Attorney, Agent, or Firm*—J. P. Sbrollini

[57] ABSTRACT

A voltage application driving method is provided for quickly changing the alignment of a liquid crystal layer in thin film transistor liquid crystal displays (TFT/LCD) to a bend alignment. In this driving method, a potential difference larger than 10 V is continuously or intermittently provided between the signal electrode of the liquid crystal cells, and the counter electrode of the display while maintaining the potential difference between the gate electrode and the signal electrode of the cells larger than 10 V. The on-time over which an intermittent potential difference is provided between the signal electrode and the counter electrode is preferably equal to or longer than the time period for part of the liquid crystal layer to effectively begin a transition to the second-stage splay alignment, and the off-time over which no potential difference is provided between the signal electrode and the counter electrode is equal to or longer than the time period necessary for the liquid crystal region of of the second-stage splay alignment to return to its state before the voltage application.

13 Claims, 4 Drawing Sheets

VOLTAGE APPLICATION DRIVING METHOD

FIELD OF THE INVENTION

The present invention relates to liquid crystal display having a liquid crystal layer with a bend alignment, and a method for causing the liquid crystal layer to transition to a bend alignment from its initial homogeneous state at high speed.

BACKGROUND ART

The applications for the liquid crystal displays have expanded as lightweight and thin displays have become alternatives to conventional CRT displays. However, liquid crystal displays have disadvantages with respect to CRT displays, such as a small viewing angle and poor motion display characteristics. One method for solving the problems of viewing angle and motion display characteristics is to use a liquid crystal cell ($\pi$ cell) in which a liquid crystal layer, sandwiched between two glass substrates, assumes, what is referred to as a bend alignment. A bend alignment is characterized, as shown in FIG. 6, in that liquid crystal adjacent the glass substrates 2 has an alignment angle substantially horizontal to the glass substrates, and an angle vertical to the glass substrate surfaces toward the center of the liquid crystal layer. The alignment angle gradually continuously changes to horizontal at the opposed glass substrate surfaces as the distance from the center of the liquid crystal layer increases. There is no twisted structure over the whole liquid crystal layer. The liquid crystal display using such a liquid crystal cell is disclosed in Japanese Published Unexamined Patent Application No. 61-116329. In the same publication, an example utilizing the $\pi$ cell as a liquid crystal display is disclosed. Further, U.S. Pat. No. 5,410,422 of Philip J, Bos discloses an idea of combining an optical compensation film with such $\pi$ cell to obtain a wide viewing angle. Furthermore, in recent years, as Uchida et al. discloses in Japanese Published Unexamined Patent Application No. 7-84254, the optical characteristics of the optical compensation film used with the cell has been examined, and the feasibility of a wider viewing angle is discussed.

The $\pi$ cell (a liquid crystal cell using a liquid crystal layer having a bend alignment) not only provides a wide viewing angle characteristic, but also a fast response time. This provides the possibility for dramatically increasing the motion display characteristics of liquid crystal cells.

A liquid crystal cell to be operated as the $\pi$ cell does not take a bend alignment in an initial state in which no electric field or the like is applied to it. In such a state, it assumes a homogeneous alignment. If the transition from a homogeneous state to a bend alignment cannot be performed at high speed, good motion display characteristics of the bend alignment state cannot be fully exploited. None of the above described references discusses this point.

The transition of the liquid crystal from a homogeneous state to the bend alignment state is performed through an intermediate state called a splay alignment. When a voltage is applied to a liquid crystal layer and the applied voltage is equal to or higher than a certain threshold voltage $V_{CR}$, the electric elastic energy of the bend alignment state is lower than the electric elastic energy of the splay alignment state. Accordingly, a bend alignment state is stable for a voltage equal to or higher than the threshold voltage $V_{CR}$, but a transition between the splay alignment state and the bend alignment state does not generally occur because of an energy barrier that exists between them. The generation of a transition nucleus is required as a condition for the occurrence of the transition. However since the energy for such a generation itself is high, it is difficult for the transition to proceed.

Generally, when power is turned on, a voltage several times greater than $V_{CR}$ is applied to accelerate transition. The process of alignment transition of liquid crystal is described using FIGS. 3 to 6. As shown in FIG. 3, initially, a liquid crystal layer 1 is in a homogeneous state. In this figure, the liquid crystal layer 1 is sandwiched between glass substrates 2 and 3. If a large voltage is applied, a splay alignment as shown in FIG. 4 is exhibited. The splay alignment state shown in FIG. 4 is observed during a very short period of time immediately after the power is turned on. It has a symmetrical structure 4 in the center of the cell. Such a centralized symmetrical splay structure is called a first-stage splay alignment. The first-stage splay alignment bears a striking resemblance to the bend alignment shown in FIG. 6 in that it is symmetrical in the center of the cell, and accordingly a transition from a first stage splay alignment to a bend alignment can be extremely fast. However, the first-stage splay alignment state is very unstable, and, as shown in FIG. 5, the symmetrical structure 4 quickly moves to the vicinity of the upper or lower glass substrate 2 or 3 to form a more stable second-stage splay alignment. The speed of the transition from a second-stage splay alignment to a bend alignment is relatively slow.

It is reported by Oku et al. in the Proceedings of General Conference of the Electronic Information Communication Society, 1996, p. 88, that the transition speed for the direct transition from the first-state splay alignment to a bend alignment is an order of magnitude faster than the transition from a second-stage splay alignment to a bend alignment. Accordingly, it would be preferable if the bend alignment state can be obtained directly from the first-stage splay alignment. However, a first-stage splay alignment's stage life is short difficult to maintain, and up until now, no method for accomplishing such a transition is known.

It was found that the transition from the first to the second stage splay alignment gradually proceeds from the outer periphery of the electrode. It is thought that, since the liquid crystal cells of a matrix-driven liquid crystal display are partitioned by vertical and lateral electrodes, a nonuniform electric field that exists in the cells contributes to this behavior. For instance, in the commonly used driving method called a H-COM inversion, because of difference in the voltage polarity between adjacent pixels or differences between the electrode potential and the pixel electrode potential, distortion which occurs in the electric field vertical to the cell surface, induces a transition to the second-stage splay alignment. Since the second-stage splay alignment having occurred in the peripheral portion of a pixel is essentially stable, it causes the first-stage splay alignment existing in the center of the pixel to transition to the second-stage splay alignment. Accordingly, it is not often that a first-stage splay alignment directly transitions to a bend alignment. In most cases, it transitions to the bend state through a second-stage splay alignment. Thus, more time is consumed for the whole pixel to reach the bend state.

Further, even if a certain pixel directly transitions to a bend alignment, the adjacent pixels do not generally transition to a bend alignment in a chain reaction. The reason for this is that, since the vertical electric field in the vicinity of electrodes existing around the pixels is smaller than the other portion, the stability of the bend alignment state is small in terms of electric elastic energy, and thus the driving force for transition to a bend alignment is also small.

Accordingly, the region in the vicinity of electrodes acts as a barrier to bend alignment expansion from a pixel to a pixel.

As described above, in the conventional driving method, in a cell structure having a partitioned pixel structure, the life of usable first-stage splay alignments is short and most of first-stage splay alignments transition to second-state splay alignments. Thus, a sufficiently fast transition speed to a bend alignment cannot be obtained. Further, there is a possibility that bend alignment transition between pixels is prevented by small regions of a small vertical electric field existing between pixels, or the transition to the bend alignment is incomplete or pixels with no bend alignment occur.

OBJECTS OF THE INVENTION

It is the first object of the present invention to provide, in a liquid crystal display using a liquid crystal layer having a bend alignment, a voltage application control method for applying a voltage to the liquid crystal layer to cause transition to a bend alignment in a short time.

It is the second object of the present invention to provide, in a liquid crystal display using a liquid crystal layer having a bend alignment, a voltage application control method for applying a voltage to the liquid crystal layer to eliminate pixel regions remaining in a splay alignment state without transitioning to the bend alignment.

SUMMARY OF THE INVENTION

In accordance with the present invention, a voltage application driving method is provided in thin film transistor liquid crystal displays (TFT/LCD) for quickly changing the alignment of the liquid crystal layer to a bend alignment. In this driving method, a potential difference larger than 10 V is continuously or intermittently provided between the signal electrode of the liquid crystal cells, and the counter electrode of a TFT/LCD while maintaining the potential difference between the gate electrode and the signal electrode of the cells larger than 10 V. The on-time over which an intermittent potential difference is provided between the signal electrode and the counter electrode is preferably equal to or longer than the time period for part of the liquid crystal layer to effectively begin a transition to the second-stage splay alignment, and the off-time over which no potential difference is provided between the signal electrode and the counter electrode is equal to or longer than the time period necessary for the liquid crystal region of the second-stage splay alignment to return to its state before the voltage application.

PREFERRED EMBODIMENTS

Figure 7:
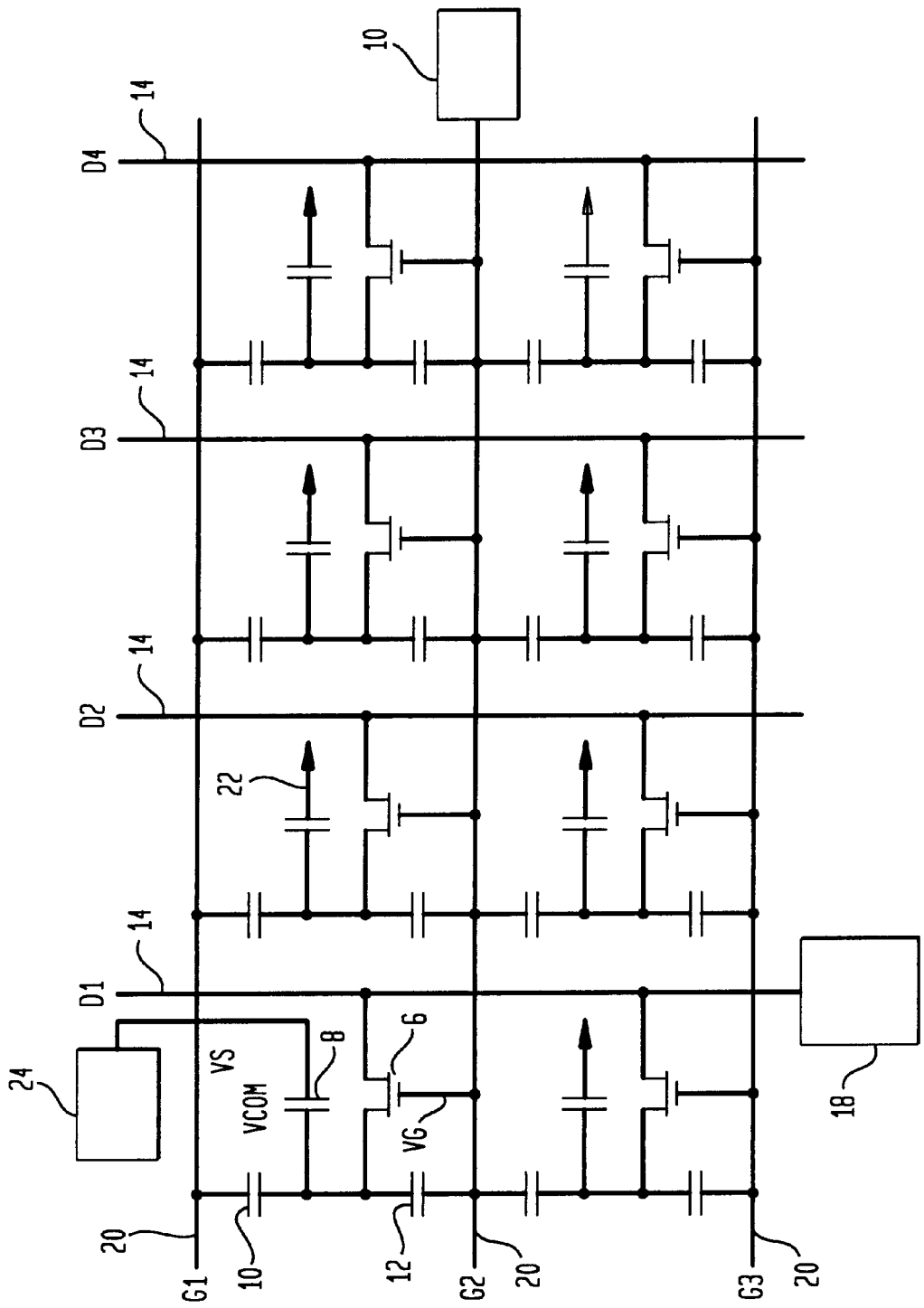
FIG. 7 is a circuit diagram of a liquid crystal display device.

FIG. 7 shows an equivalent circuit of display pixels of a liquid crystal display device. The signal or drain electrodes of TFTs 6 are each connected to a data line 14 that is attached to a data line driving circuit 18. Gate electrodes of the TFTs 6 are each connected to a gate line 20 that is connected to a gate line driving circuit 16. Source electrodes of the TFTs 6 are connected to respective display electrodes. The liquid crystal between the display electrodes on the array substrate and a common or counter electrode 22 on the opposed substrate constitutes the liquid crystal capacitance 8. The common electrode 22 is driven by a common electrode driving circuit 24. Part of each display electrode is laid on a gate line 20 of the immediately preceding scanline, to constitute an auxiliary capacitor 10. A parasitic capacitance 12 exists between the gate and source of the TFT 6.

Figure 1A:
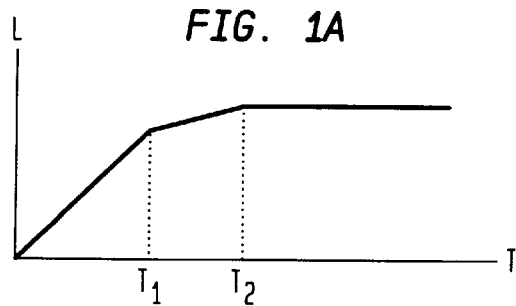
FIG. 1 is a figure showing the voltage application driving method related to the first embodiment of this application.
Figure 1B:
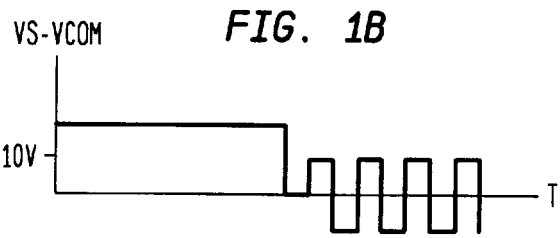
Figure 1C:
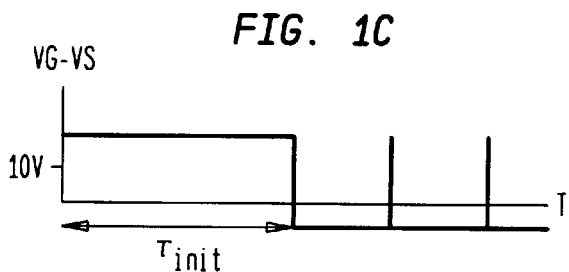

FIG. 1($a$) shows the proportion (L) of the bend alignment region in relation to time (T) when the voltage $V_s-V_{com}$ is shown in FIG. 1($b$) is provided between the signal electrode and the counter electrode, and the voltage $V_g-V_s$ shown in FIG. 1($c$) is provided between the gate electrode and the signal electrode. In this embodiment, a bend alignment transition of the whole display panel is caused by a single-shot pulse signal. As shown simultaneously with, or a very short time after, the turning-on of the gate, a bias signal is applied between the counter electrode and the signal electrode to cause a bend alignment.

First, to turn on the gate, the gate electrode potential $V_g$ is set to 10 V d.c. or greater with respect to the signal electrode potential $V_s$. That is, $V_g-V_s>10$ V and $V_g-V_s$ is preferably greater than 20 V. First of all, the application of a voltage in this region ensures enough conduction between the pixel electrodes for any signal electrode voltage to provide an effective electric field to effect a bend alignment. Secondly, by making the gate electrode voltage high, the first-stage splay alignment state on the gate electrode can be maintained for a sufficiently long time for a fast transition to a bend alignment.

Simultaneously or within a short time of biasing, $V_g$ and $V_s$, as described above, a bias voltage is applied to the signal electrode potential $V_s$ relative to the counter electrode potential $V_{com}$. This bias voltage, $V_s-V_{com}>10$ V, and is preferably>20 V. The rise time of this $V_{s-Vcom}$ pulse is to be as short as possible, preferably 50 ms or less. This is because, the longer the rise time, the shorter the time period over which first-stage splay alignment exists.

The application time of the pulse related to $V_s-V_{com}$ depends on the density of the transition nucleus of the first-stage splay alignment generated in the liquid crystal, the speed of the generation region of the transition nucleus growing to the surrounding area, and the time period over which the first-stage splay alignment state transitions to the second-stage splay alignment state. For instance, if the density of the transition nucleus of the first-stage splay alignment is sufficiently large, and the growth of the first-stage splay region is reached in a short time, then it is only needed to apply the pulse until that occurs. On the other hand, if the density of the transition nucleus is small or the growth speed is slow, the pulse must be applied for a longer. However, the length of time is restricted by the time period over which the transition nucleus of the first-stage splay alignment transitions to the second-stage splay alignment.

Referring to FIG. 1($a$), it is seen that, with the applying of the $V_s-V_{com}$ voltage, the proportion (L) of the bend alignment region linearly increases with time. Inflection points occur in L at $T_1$ and $T_2$. The transition to the bend alignment during the period 0 to $T_1$ is performed through a path of homogeneous alignment (first-stage splay alignment to bend alignment) which has a fast transition time. During the period $T_1$ to $T_2$, the second-stage splay alignment state intervenes in the transition to a bend alignment. That is, after time $T_1$, the region of the first-stage splay alignment generated by the voltage application transitions to the second-stage splay alignment, and as a result, the speed ($\Delta L/\Delta T$) of the transition to a bend alignment is different.

According to a second embodiment (shown in FIG. 2), the bend alignment transition of the whole display panel is accomplished with intermittent pulse signals. The embodiment is preferred if $V_s-V_{com}$ has to be small because of the restrictions on driver breakdown voltage or the like, or if the total liquid crystal region cannot be made to transition to the first-stage splay alignment with a one pulse application because of the above described generation density and growth speed of the transition nucleus of the first-stage splay alignment. In such case, the time period over which the first-stage splay alignment exists is relatively short, and the increase speed of the radius of the bend alignment region is small. Accordingly, the region of liquid crystal of the first-stage splay alignment generated by the first voltage application transitions to the second-stage splay alignment easily and in a short time. As a result, the speed of the transition to the bend alignment is slow. Further, if $V_s-V_{com}$ is small, only a low vertical electric field can occur on both sides of the surrounding electrodes, and thus pixel regions remain in the second-stage splay alignment without transitioning to the bend alignment.

Figure 2A:
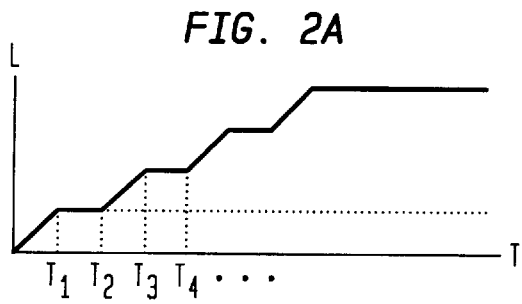
FIG. 2 is a figure showing the voltage application driving method related to the second embodiment of this application.
Figure 2B:
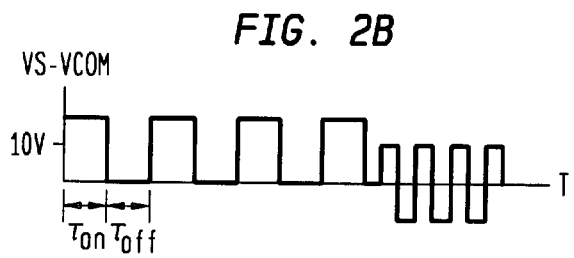
Figure 2C:
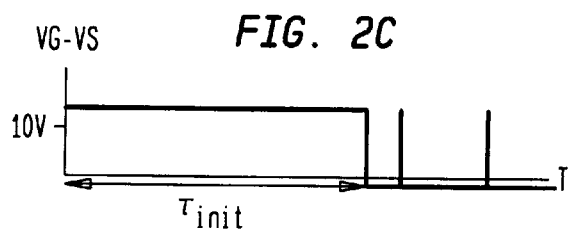
Figure 3:
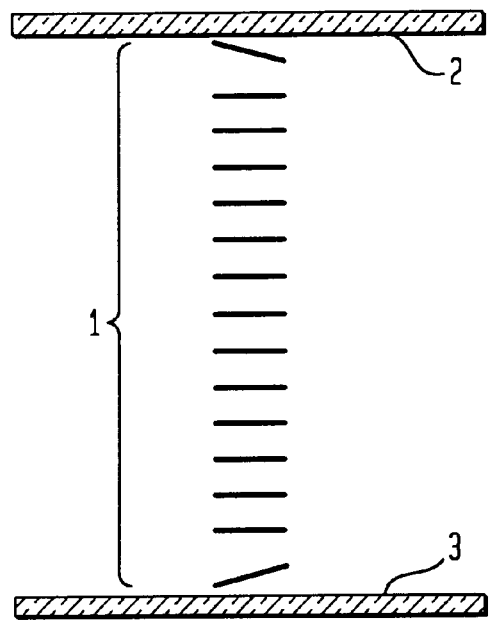
FIG. 3 is a figure showing the initial homogeneous liquid crystal alignment state.
Figure 4:
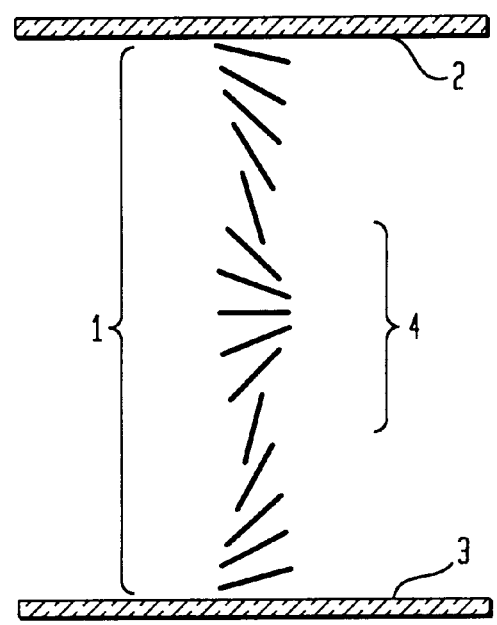
FIG. 4 is a figure showing the liquid crystal alignment state by the first-stage splay alignment.
Figure 5:
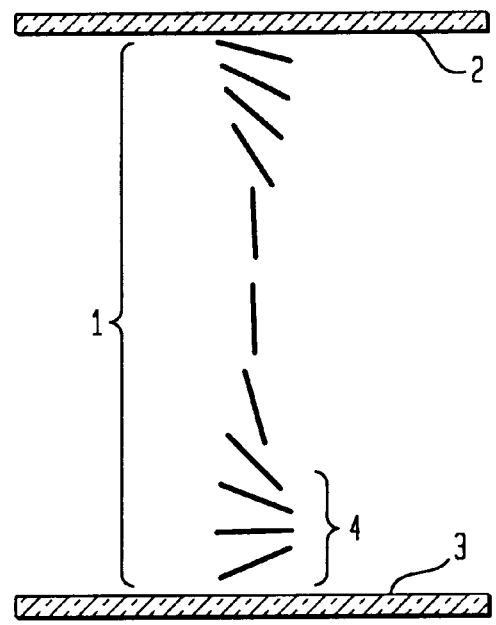
FIG. 5 is a figure showing the liquid crystal alignment state by the second-stage splay alignment.
Figure 6:
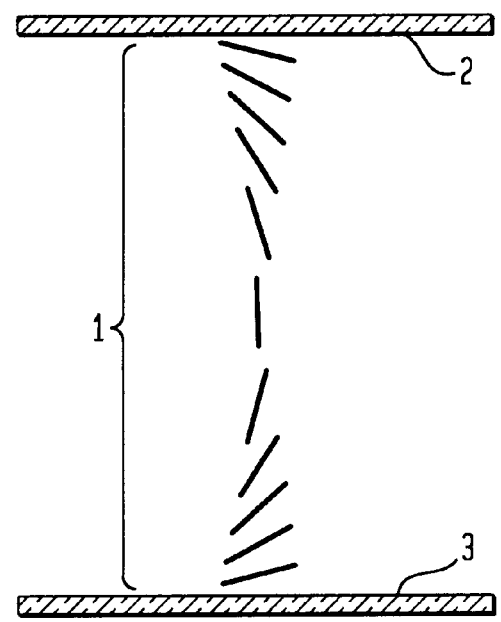
FIG. 6 is a figure showing the liquid crystal alignment state by the bend alignment.

FIG. 2(a) shows the proportion (L) of the bend alignment region in relation to time (T) for the second embodiment where the voltage shown in FIG. 2(b) is provided between the signal electrode and the counter electrode, and the voltage shown in FIG. 2(c) is provided between the gate electrode and the signal electrode. In this second embodiment, first a negative bias voltage is applied to the counter electrode relative to the signal electrode for a predetermined time (shown by $\tau_{on}$ in FIG. 2(b)). Then 0 V or substantially 0 V is applied between the signal electrode and the counter electrode for a predetermined time (shown by $\tau_{off}$ in FIG. 2(b)), to restore the original homogeneous state to the liquid crystal region changed to the second-stage splay alignment by the first mentioned negative bias voltage application. Thereafter, by repeating the application of the mentioned negative bias voltage followed by the application of substantially 0 V, in steps, the homogeneous alignment is made to transition to the first-stage splay alignment and then to the bend alignment to obtain a fast bend alignment transition. In selecting the length of the pulses, the second embodiment utilizes the fact that the speed at which the bend alignment liquid crystal region returns to the homogeneous state during the application of substantially 0 V is sufficiently slower than the speed at which the liquid crystal region of the second-stage splay alignment returns to the homogeneous state. This can prevent the area of the liquid region which has transitioned to the bend alignment from reverting into the homogeneous state by the application of substantially 0 V.

$V_s-V_{com}$ is larger than 10 V. Further, the on-voltage application time $\tau_{on}$ is set to be substantially equal to or a little longer than the time period over which the first-stage splay alignment begins to transition to the second-stage splay alignment. The life of the first-stage splay alignment depends on the type of the liquid-crystal and $V_s-V_{com}$. Further, the time period $\tau_{off}$ over which no bias voltage is applied (application time of substantially 0 V) is set to be substantially equal to or a little longer than the time period over which the liquid crystal region of the second-stage splay alignment is reduced to the homogeneous state. As a result, the duty ratio of the pulse in which the second embodiment is operable is 30 to 70%, preferably 40 to 60%. The repetition frequency is about 0.5 Hz to 10 Hz, preferably 1 to 3 Hz. Further, as in the first embodiment, a constant voltage, $V_g-V_s$, is provided to the gate. This voltage is large enough to ensure, for any signal electrode voltage, sufficient conduction between pixel electrodes for all pixels, and provide an effective electric field for a bend alignment.

As shown in FIG. 2(a), a liquid crystal region having a bend alignment is generated in the time period $\tau_{on}$ from time 0 to $T_1$. The transition to the bend alignment in the time period reaches the bend alignment state through a first-stage splay alignment from a homogeneous state which is the initial state. Accordingly, a bend alignment is reached in a very short time. Then, in the time period $\tau_{off}$ from time $T_1$ to $T_2$, the liquid crystal region having a bend alignment generated during the time period $\tau_{on}$ from time 0 to $T_1$ does not decrease. However, the liquid crystal region having the second splay alignment generated during the time period $\tau_{on}$ from time 0 to $T_1$ is restored to the initial homogeneous state. This is because the time period over which the liquid crystal in the second-stage splay alignment state returns to the homogeneous state is shorter than the time period over which the liquid crystal in the bend alignment state returns to the homogeneous state. The use of this allows the liquid crystal region having the bend alignment in the time period $\tau_{on}$ from time $T_2$ to $T_3$ to increase over the liquid crystal region having the bend alignment in the time period $\tau_{on}$ from time 0 to $T_1$. In the time period $\tau_{off}$ from time $T_3$ to $T_4$, the liquid crystal region having the second-stage splay alignment generated in the $\tau_{on}$ time period from time $T_2$ to $T_3$ returns to the initial homogeneous state, as in the $\tau_{off}$ time period from time $T_1$ to $T_2$. Such voltage application by intermittent pulses allows the proportion (L) of the bend alignment region to gradually increase as shown in FIG. 2(a).

The following is a result of the measurement made for the transition time from the homogeneous state to the bend alignment using actual liquid crystals according to the above two embodiments.

Those used for the measurement are liquid crystals having the physical characteristic values shown in Table 1.

TABLE 1

| Liquid Crystal | k1 | k3 | $\Delta \epsilon$ |
| --- | --- | --- | --- |
| A | 12.4 | 15.5 | 9.8 |
| B | 11.1 | 13.5 | 10.2 |
| C | 8.2 | 14.8 | 8.9 |

As the embodiments, the single-shot pulse method, which is the first embodiment, and the intermittent pulse method (3 Hz, 50% duty), which is the second embodiment, were used. Further, as a comparative example, the H-com inversion, which is the conventional driving method, was used in which the absolute value of the pixel bias voltage was set to the value of $V_s-V_{com}$.

Table 2 shows the case in which the driving was performed under conditions of $V_g-V_s$=20 V and $V_s-V_{com}$=10 V. Numerical values in the table represent time taken for the transition to the bend alignment, and for instance, the designation of "5<" indicates that time more than five seconds is taken for the bend transition. Further, as to the case in which the whole screen does not transition to the bend alignment and splay alignment are remaining, it was represented by "X."

TABLE 2

Embodiment of the Present Invention

| Liquid Crystal | First Embodiment | Second Embodiment | Comparative Example |
|---|---|---|---|
| A | 5< | 3 | X |
| B | 5< | 3 | 10< |
| C | 5< | 2.5 | 10< |

Now, Table 3 shows the case in which the driving was performed under conditions of $V_g-V_s=20$ V and $V_s-V_{com}=15$ V.

TABLE 3

Embodiment of the Present Invention

| Liquid Crystal | First Embodiment | Second Embodiment | Comparative Example |
|---|---|---|---|
| A | 1.4 | 1.5 | 10< |
| B | 1.4 | 1.3 | 10< |
| C | 1.4 | 0.9 | 5< |

Now, Table 4 shows the case in which the driving was performed under conditions of $V_g-V_s=20$ V and $V_s-V_{com}=20$ V.

TABLE 4

Embodiment of the Present Invention

| Liquid Crystal | First Embodiment | Second Embodiment | Comparative Example |
|---|---|---|---|
| A | 0.7 | 0.9 | 8 |
| B | 0.6 | 0.9 | 10 |
| C | 0.5 | 0.6 | 1.5 |

Generally viewing the above result, both the first and second embodiments have a tendency that the transition time to the bend alignment is shortened more largely than the case in which the H-com inversion which is the conventional method is used. However, this tendency also considerably depends on the physical characteristic values of the liquid crystals to be used. For instance, this tendency is remarkable for the liquid crystals A and B, but it is not so remarkable for the liquid crystal C.

Now, Tables 5 and 6 show the results of the measurement which was made using the liquid crystal C whose bend alignment transition characteristic is considered to be the best, while changing the pulse frequency, duty ratio and the like of the intermittent pulse method, which is the second embodiment.

Table 5 shows the case in which the driving was performed with the intermittent pulse method under conditions of $V_g-V_s=20$ V and $V_s-V_{com}=10$ V.

TABLE 5

| Frequency (Hz) → Duty Ratio (%) ↓ | 0.5 | 1 | 2 | 3 |
|---|---|---|---|---|
| 20 | 4.3 | X | 4 | 4 |
| 30 | 4 | 3.5 | 3.5 | 3.5 |
| 50 | 3 | 2.5 | 2.5 | 2.5 |
| 70 | 5 | 4.5 | 3.5 | 3.0 |
| 80 | 2.5 | 2.5 | X | X |

Table 6 shows the case in which the driving was performed with the intermittent pulse method under conditions of $V_g-V_s=20$ V and $V_s-V_{com}=20$ V.

TABLE 6

| Frequency (Hz) → Duty Ratio (%) ↓ | 0.5 | 1 | 2 | 3 |
|---|---|---|---|---|
| 20 | X | X | X | X |
| 30 | 2.5 | 2.5 | 2.0 | 2.0 |
| 50 | 1.5 | 1.5 | 1.0 | 0.6 |
| 70 | 1.5 | 1.5 | 1.0 | 1.0 |
| 80 | 1.5 | 1.5 | 1.0 | X |

From the above, it is seen that a good result can be obtained when the duty ratio is in a range of about 30 to 70%. Further, in this range, a good result can be obtained for any pulse frequency of 0.5 to 3 Hz.

Further, for the case in which the duty ratio is set to 50% and the potential difference between the counter electrode and the signal electrode is minimized (referred to as application of substantially 0 V in this specification), the relationship between the potential difference and the bend alignment transition characteristic is shown. It is noted that $V_g-V_s=20$ V and $V_s-V_{com}=20$ V, and the pulse frequency is 3 Hz.

TABLE 7

| Frequency (Hz) → Potential Difference (V) ↓ | A | B | C |
|---|---|---|---|
| 0 | 0.9 | 0.9 | 0.6 |
| 0.5 | 1.3 | 1.3 | 0.6 |
| 0.8 | 1.6 | 1.6 | 0.9 |
| 1.0 | 1.9 | 1.9 | 0.9 |
| 1.2 | 2.3 | 2.3 | 1.3 |
| 1.5 | 3.3 | 3.3 | 2.5 |

According to this, it is found that the minimum potential difference between the counter electrode and the signal electrode is most preferably maintained to be 0 V, but the problems of the invention of this application can be fully solved if it is in the order of ±1 V. And, the minimum potential difference is preferably in the range of around ±0.8 V.

In accordance with the invention of this application, the time taken for causing the whole panel region to transition to the bend alignment is shortened to about 1/3 to 10/1 as compared with the conventional voltage application driving method, and regions of liquid layers which do not transition to the bend alignment can be completely prevented.

It should be understood that the embodiments described herein have been provided by way of example and not by way of limitation. Many modifications which do not depart from the scope and spirit of the appended claims will be apparent to those skilled in the art.

We claim:

1. In a liquid crystal display comprising a first substrate on which display electrodes each connected to a thin film transistor with gate and signal-electrodes are formed in a matrix, a second substrate opposed to said first substrate and having a counter electrode formed thereon, a liquid crystal layer positioned between said first substrate and said second substrate, a first voltage applying circuit for applying a voltage to the gate electrode of said thin film transistor, and a second voltage applying circuit for applying a voltage, between a signal electrode of said thin film transistor and said counter electrode and through the thin film transistor to the display electrode connected to the thin film transistor, a voltage application driving method for quickly changing the alignment of said liquid crystal layer to a bend alignment through a first stage splay alignment and a slower second stage splay alignment, the method comprising:

providing a potential difference larger than 10 V between said signal electrode and said counter electrode while maintaining the potential difference between said gate electrode and said signal electrode larger than 10 V, providing the potential difference between said signal electrode and said counter electrode during the time period over which the potential difference is maintained between said gate electrode and said signal electrode so that said liquid crystal layer assumes the bend alignment.

2. A voltage application driving method according to claim 1, including the step of providing the potential difference between said signal electrode and said counter electrode in several pulses within the time period over which the potential difference is maintained between said gate electrode and said signal electrode.

3. A voltage application driving method according to claim 2 including the step of providing the potential difference between said signal electrode and said counter electrode for 30 to 70% of the time period over which a potential difference is maintained between said gate electrode and said signal electrode.

4. A voltage application driving method according to claim 2 including the step of applying 0±1 V between said signal electrode and said counter electrode for the time other than the time periods over which a potential difference is applied between said signal electrode and said counter electrode.

5. In a liquid crystal display comprising a first substrate on which display electrodes each connected to a thin film transistor with gate and signal electrodes are formed in a matrix, a second substrate opposed to said first substrate and having a counter electrode formed thereon, a liquid crystal layer positioned between said first substrate and said second substrate, a first voltage applying circuit for applying a voltage to the gate electrode of said thin film transistor, and a second voltage applying circuit for applying a voltage, between a signal electrode of said thin film transistor and said counter electrode and through the thin film transistor to the display electrode connected to the thin film transistor, a voltage application driving method for quickly changing the alignment of said liquid crystal layer to a bend alignment through a first stage splay alignment and a slower second stage splay alignment, the method comprising:

intermittently providing a potential difference larger than 10 V between said signal electrode and said counter electrode while maintaining a potential difference between said gate electrode and said signal electrode larger than 10 V, the time period over which a potential difference is provided between said signal electrode and said counter electrode being equal or longer than the time period for part of said liquid crystal layer to effectively begin a transition to said second-stage splay alignment, and the time period over which no potential difference is applied between said signal electrode and said counter electrode being equal to or longer than the time period necessary for the liquid crystal region of said second-stage splay alignment to return to the state before the voltage application.

6. In a liquid crystal display comprising a first substrate on which display electrodes each connected to a thin film transistor with gate and signal electrodes are formed in a matrix, a second substrate opposed to said first substrate and having a counter electrode formed thereon, a liquid crystal layer positioned between said first substrate and said second substrate, a first voltage applying circuit for applying a voltage to the gate electrode of said thin film transistor, and a second voltage applying circuit for applying a voltage, between a signal electrode of said thin film transistor and said counter electrode and through the thin film transistor to the display electrode connected to the thin film transistor, a voltage application driving method for quickly changing the alignment of said liquid crystal layer to a bend alignment through a first stage splay alignment and a slower second stage splay alignment, the method comprising:

intermittently providing a potential difference between said signal electrode and said counter electrode while maintaining a potential difference between said gate electrode and said signal electrode large enough to insure enough conduction through the thin film transistor to effect a change to bend alignment from the first stage splay alignment during a first pulse of the potential difference where the time period over which the first pulse of potential difference is provided between said signal electrode and said counter electrode is equal or longer than the time period for part of said liquid crystal layer to effectively begin a transition to said second-stage splay alignment, and the time period over which no potential difference is applied between said signal electrode and said counter electrode being equal to or longer than the time period necessary for the liquid crystal region of said second-stage splay alignment to return to the state before the voltage application so that transition to bend alignment occurs from the first stage splay alignment in a succeeding pulse of the potential difference.

7. A voltage application driving method according to claim 6, including the step of providing the potential difference between said signal electrode and said counter electrode in more than two pulses within the time period over which the potential difference is maintained between said gate electrode and said signal electrode.

8. A voltage application driving method according to claim 7, including the step of providing the pulses of potential difference between said signal electrode and said counter electrode with a duty cycle of 30 to 70% during the time period over which a potential difference is maintained between said gate electrode and said signal electrode.

9. A voltage application driving method according to claim 8, including the step of applying a voltage of no more than ±1 V between said signal electrode and said counter electrode between the times which the pulses of potential difference are applied between said signal electrode and said counter electrode.

10. In a liquid crystal display comprising a first substrate on which display electrodes each connected to a thin film transistor are formed in a matrix, a second substrate opposed to said first substrate and having a counter electrode formed thereon, a liquid crystal layer positioned between said first substrate and said second substrate, a first voltage applying circuit for applying a voltage to the gate electrode of said thin film transistor, and a second voltage applying circuit for applying a voltage, between a signal electrode of said thin film transistor and said counter electrode and through the thin film transistor to the display electrode connected to the thin film transistor, a voltage application driving method for changing the alignment of said liquid crystal layer from a homogeneous crystal alignment state to a bend alignment state through a first stage splay alignment and a slower second stage splay alignment, the method comprising:

maintaining a potential difference between said gate electrode and said signal electrode during a transition from the homogeneous crystal alignment state to the bend alignment state, providing a potential difference between said signal electrode and said counter electrode during the time period over which the potential difference is maintained between said gate electrode and said signal electrode both said potential differences at high levels that restrain changing of the crystal layer from the first stage splay alignment to minimize the portion of the transition to bend alignment that occurs during the second stage splay alignment so that said liquid crystal layer quickly assumes the bend alignment state.

11. A voltage application driving method according to claim 10, including the step of providing the potential difference between said signal electrode and said counter electrode in more than two pulses within the time period over which the potential difference is maintained between said gate electrode and said signal electrode.

12. A voltage application driving method according to claim 11, including the step of providing the pulses of potential difference between said signal electrode and said counter electrode for 30 to 70% of the time period over which a potential difference is maintained between said gate electrode and said signal electrode.

13. A voltage application driving method according to claim 12, including the step of applying 0±1 V between said signal electrode and said counter electrode for the time other than the time periods over which a potential difference is applied between said signal electrode and said counter electrode.

* * * * *